United States Patent [19]
Hatakeyama

[11] Patent Number: 5,483,657
[45] Date of Patent: Jan. 9, 1996

[54] METHOD OF CONTROLLING EXECUTION OF A DATA FLOW PROGRAM AND APPARATUS THEREFOR

[75] Inventor: Kouichi Hatakeyama, Nara, Japan

[73] Assignee: Sharp Kabushiki Kaisha, Osaka, Japan

[21] Appl. No.: 22,265

[22] Filed: Feb. 25, 1993

[30] Foreign Application Priority Data

Feb. 26, 1992 [JP] Japan ..................... 4-039037

[51] Int. Cl.⁶ ..................................... G06F 15/82
[52] U.S. Cl. ..................... 395/800; 364/DIG. 1; 364/232.22; 364/280; 364/280.4; 364/281.6; 395/700
[58] Field of Search ..................... 395/800, 200, 395/275, 725, 425, 700, 375

[56] References Cited

U.S. PATENT DOCUMENTS

| | | | |
|---|---|---|---|
| 4,943,916 | 7/1990 | Asano et al. | 395/775 |
| 4,953,083 | 8/1990 | Takata et al. | 395/250 |
| 4,972,315 | 11/1990 | Yamasaki et al. | 395/400 |
| 5,197,002 | 3/1993 | Spencer | 395/425 |

*Primary Examiner*—Mehmet Geckil

[57] ABSTRACT

A plurality of data packets flow into a data driven type information processor when a program is executed. These data packets each queue for a data packet to be paired therewith in a matching memory in the information processor. Among these data packets, data packets which store instruction information executable in parallel are designated to have different address spaces in the matching memory for queuing data packets to be paired therewith, and therefore collision due to competition in accessing on the matching memory is avoided, thereby increasing processing speed.

32 Claims, 8 Drawing Sheets

CPS: PROGRAM STORAGE UNIT
FC: FIRING CONTROL UNIT
FP: OPERATION UNIT
QJB: INPUT/OUTPUT CONTROL UNIT

F1: DESTINATION FIELD    F2: INSTRUCTION FIELD
F3: DATA 1 FIELD    F4: DATA 2 FIELD    F5: FLAG FIELD    fg: CIRCULATING FLAG

METHOD OF CONTROLLING EXECUTION OF A DATA FLOW PROGRAM AND APPARATUS THEREFOR

BACKGROUND OF THE INVENTION

Field of the Invention

The present invention relates generally to methods of controlling execution of a data flow program and apparatus therefor, Land more specifically, to a method of controlling execution of a data flow program so as to avoid the collision of data.

Description of the Background Art

In a conventional von Neumann computer, various instructions are stored in advance in a program memory as a program, and addresses in the program memory are sequentially specified by a program counter so that the instructions are sequentially read out, and then instructions are executed. Meanwhile, a data driven type information processor is one type of non-von Neumann computer which does not execute sequential instructions by a program counter. Such data driven type information processor employs an architecture based on parallel processing of instructions. In the data driven type information processor, collection of data to be operated triggers execution of an instruction, and a plurality of instructions are driven by the data, so that the program is executed in a parallel manner in accordance with the natural flow of the data. As a result, the time required for operation is greatly reduced.

FIG. 7 is a block diagram showing a data driven type information processor applied to a conventional example and one embodiment of the invention. A data driven type information processor 300 in FIG. 7 includes a terminal IN for inputting external data, a terminal OUT for externally outputting data, an input/output control unit QJB, a program storage unit CPS, a firing control unit FC and an operation unit FP. FIG. 8 is a block diagram showing the structure of firing control unit FC.

FIG. 9 illustrates the field structure of a data packet used in data driven type information processor 300 shown in FIG. 7. Referring to FIG. 9, the data packet includes a destination field F1, an instruction field F2, a data 1 field F3, a data 2 field F4, and a flag field F5. Destination information is stored in destination field F1, instruction information is stored in instruction field F2, and operand data is stored in data 1 field F3 or data 2 field F4. A circulating flag fg is stored in flag field F5 in order to indicate that a data packet circulates in information processor 300 without any processing.

Referring to FIG. 7, input/output control unit QJB includes a function of inputting a data packet applied from terminal IN or operation unit FP and selects one of terminal OUT and program storage unit CPS by referring to its destination info,nation and outputting the data packet to the selected one. Program storage unit CPS is a temporary storage portion for a data flow program built in information processor 300, and includes a memory permitting high speed accessing, such as cache memory. Since firing control unit FC detects a pair of different data packets, produces one data packet and outputs the data packet (hereinafter referred to as firing), as illustrated in FIG. 8, it includes a hash address operation portion 1, an addressing portion 2, a matching memory 3, a writing portion 4, a PB determination portion 5, a destination information comparison portion 6, and a packet output portion 7 including a circulating packet producing portion 71 and a firing packet producing portion 72. Operation portion FP inputs an applied data packet, decodes the instruction information of the input data packet, and subjects operand data stored in that input data packet to operation processing based on the result of decoding. The operation result data is stored in the data 1 field F3 of the input data packet, and the input packet is output.

FIG. 10 illustrates the field structure of part of the storage content of program storage unit CPS in FIG. 7. FIG. 11 illustrates the field structure of part of the storage content of matching memory 3 in firing control unit FC in FIG. 8.

In FIG. 10, program storage unit CPS stores a data flow program in advance. The data flow program includes a plurality of sets of information formed of destination information in the next order and instruction information in the next order. Program storage unit CPS, in response to input of a data packet applied from input/output control unit QJB, reads out the next order destination information and the next order instruction information from the data flow program by addressing based on destination information in the destination field of the input data packet. The read out destination information and instruction information are stored in the destination field F1 and instruction field F2 of the input data packet, respectively, and the input data packet is output to firing control unit FC.

The data packet output from program storage unit CPS is, as illustrated in FIG. 8, applied to the hash address operation portion 1, writing portion 4, destination information comparison portion 6, and packet output portion 7 of firing control unit FC at one time. Hash address operation portion 1 inputs the applied data packet, subjects the content of the destination field F1 of the input data packet to a prescribed hash operation, and provides the obtained operation result value (hereinafter referred to as hash address) to addressing portion 2. Address designation portion 2 accesses matching memory 3 by addressing based on the provided hash address. Matching memory 3, as illustrated in FIG. 11, includes a region to store a firing detection bit PB for detecting whether or not the data stored in the addressing region based on the hash address is fired, and a destination field f1, an instruction field f2, and a data field f3 for storing the contents of destination field F1, instruction field F2 and data 1 field F3, respectively in the data packet input to firing control unit FC. The firing detecting bit PB is set to "1" only when a data packet stored in the corresponding region is queuing for a data packet to be paired with the data packet, in other words only when it is in a non-fired state, and otherwise it is set to "0". Information read out from matching memory 3 by the accessing of addressing portion 2 is applied to PB determination portion 5, destination information comparison portion 6, and packet output portion 7 at one time. PB determination portion 5 determines the firing detection bit PB in the information read out from matching memory 3, and applies a writing signal WS to writing portion 4 if (PB=0) holds and a comparison signal CS to destination information comparison portion 6 conversely if (PB=1) holds. Writing portion 4 writes the information in the applied input data packet to a region designated by the address designation portion 2 of matching memory 3 and sets a corresponding firing detection bit PB to "1" in the region, in response to the application of the writing signal WS from PB determination portion 5. Thus, the input data packet can queue for input of a data packet to be paired therewith in matching memory 3. Destination information comparison portion 6 responds to the application of the comparison signal CS and compares the destination information read out by the above-stated addressing from matching memory 3 and the destination information in the input data packet. The comparison is conducted by comparing the respective values both destination information indicate. According to the result of the comparison, a PB reset signal RS for resetting the firing detection bit PB and the above-described writing signal WS are applied to writing portion 4, and the comparison result signal CR indicating the result of the comparison is applied to packet output portion 7. Packet output portion 7, in response to the application of the comparison result signal CR, produces and outputs a data packet. This operation will be described in detail.

If the comparison result signal CR indicates that the value of the destination information in the input data packet is larger than that of the destination information read out from matching memory 3, a circulating packet producing portion 71 sets the circulating flag fg of the input data packet to "1" and outputs the input data packet to operation unit FP, in response to the application of the comparison result signal CR. If the comparison result signal CR indicates that the value of the destination information in the input data packet is smaller than that of the destination information read out from matching memory 3, destination information comparison portion 6 outputs the writing signal WS to writing portion 4. Furthermore, circulating packet producing portion 71, in response to the application of the comparison result signal CR, produces the data packets stored in fields F1, F2 and F3 with the contents of fields f1, f2, and f3, respectively read out from matching memory 3, then sets the circulating flag fg of the data packet to "1", and outputs the data packets to operation unit FP. Meanwhile, writing portion 4, in response to the writing signal WS applied from designation information comparison portion 6, writes the contents of fields F1, F2, and F3 of the input data packet to fields f1, f2, and f3 in the addressing region of matching memory 3. Having the same addressing region in matching memory 3, the two different data packets have collided with each other. One of the data packets is forced out of memory 3 by this collision, and the other data packet is given priority to queue for input of data to be paired therewith in matching memory 3.

When the comparison result signal CR indicates that the value of the destination information in the input data packet agrees with that of the destination information read out from matching memory 3, firing packet producing portion 72 stores the content of field f3 read out from matching memory 3 to the field F4 of the input data packets and outputs the input data packet to operation unit FP in response to the application of the comparison result signal CR. This means that a firing has been detected in firing control unit FC. At that time, since destination information comparison portion 6 applies the PB reset signal RS to writing portion 4, writing portion 4 in response sets a firing detection bit PB corresponding to the addressing region of matching memory 3 to "0".

Now, operation of a data flow program in data driven type information processor 300 shown in FIG. 7 will be described. It is assumed that a data flow program is stored in program storage unit CPS in advance, and firing detection bits PB in matching memory 3 are all set to "0".

A data packet is first input to input/output control unit QJB from terminal IN, and input/output control unit QJB outputs the input data packet selectively to one of program storage unit CPS and terminal OUT based on destination information in the input data packet. The data packet output to the side of terminal OUT is applied to another external information processor connected to information processor 300. Program storage unit CPS inputs the applied data packet, outputs the input data packet without undergoing any processing if a circulating flag fg in the input data packet is "1", and otherwise reads the next order destination information and instruction information from the data flow program by addressing based on the destination information of the input data packet. The state of this reading operation is illustrated in FIG. 10. The read destination information and instruction information are stored in the fields F1 and F2 of the input data packet, respectively, and the input data packet is applied to firing control unit FC.

Firing control unit FC inputs the data packet applied from program storage unit CPS, subjects the input data packet to a hash operation based on the destination information, and accesses matching memory 3 by hash addressing based on the operation value. If the firing detection bit PB in matching memory 3 designated by the hash address is "0", the content of the input data packet is written in the addressing region and a corresponding firing detection bit PB is set to "1". Conversely, if the firing detection bit PB corresponding to the hash addressing region is "1", it is detected whether or not the input data packet and the data packet stored in the hash addressing region fire. If a firing is detected, as described above, the data packet which stores an operand data pair is output to operation unit FP by firing packet producing portion 72. Meanwhile, if no firing is detected, in other words if different data packets collide with each other in matching memory 3, circulating packet producing portion 71 elects one of the data packets, the circulating flag fg in the selected one is set to "1", and selected data packet is output to operation unit FP.

Operation unit FP inputs the data packet applied from firing control unit FC. Operation unit FP decodes instruction information in the input data packet if the circulating flag fg in the input data packet is not "1", subjects operand data in the input data packet to an operation, stores the operation result data in the field F3 of the input data packet and outputs the input data packet. If the circulating flag fg in the input data packet is "1", operation unit FP outputs the input data packet without undergoing any processing.

In the foregoing, processing according to the data flow program proceeds as the data packet goes from program storage unit CPS→firing control unit FC→operation unit FP→. . . , while queuing for input of data to be paired therewith in matching memory 3.

FIG. 12 illustrates a conventional procedure of developing a data flow program. As illustrated in FIG. 12, developing the data flow program includes a text editor 100, a compiler 110, a linker 120 and a mapper 125, and their functions are prepared in software in, for example, a work station. The edit processing of text editor 100 produces a source program 200. The source program 200 is basically written with a C language together with a parallel processing language added with descriptions suitable for data driving. Compiler 110, linker 120 and mapper 125 are processing systems suitable for the parallel processing language. Then, the source program 200 is grammatically analyzed by compiler 110, and developed into a plurality of flow graphs 210 having a structure showing data flow on the program in parallel. At that time, the plurality of flow graphs 210 are arranged so as to operate in accordance with the order of instruction execution and transferred to linker 120. Linker 120 inputs the plurality of flow graphs 210 applied from compiler 110, combines them into one flow graph which can be processed in information processor 300, and provides the same to mapper 120 as a flow graph structure analysis file 220. Mapper 125 produces a load module 230 based on the flow graph structure analysis file 220. The load module 230 is program data developed in a format executable in a target system (data driven type information processor 300).

FIG. 13 is an example of a flow graph obtained by analyzing a data flow program utilizing the developing procedure shown in FIG. 12. In FIG. 13, the pentagon symbol represents an input node, and the circular symbol represents an instruction node Ni (i= 0, 1, 2, . . . ,). The input node is allotted with the name of data to be input, and instruction node Ni is allotted with an operation instruction to be executed. An operation instruction to be allotted to each of the instruction nodes corresponds to instruction information in the data flow program. Each instruction node Ni in the figure is allotted with a node number #j (j=0, 1, 2, . . . ,), with the number increasing from 0 at the upper left portion of the flow graph sequentially by 1 toward the lower right portion. A node number #j attached to each instruction node corresponds to destination information in the data flow program. A value k in parentheses near a node number #j represents a hash address for addressing in matching memory 3 shown in FIG. 8. The hash address k is an operation value produced by subjecting a corresponding node number #j to a hash operation F and defined as follows:

$$k=F(j)$$

The hash operation F applied to the flow graph shown in FIG. 13 is such an operation that the remainder given by dividing the value j of the node number by a value of 2 is taken as an operation result. Accordingly, the range of hash address k is given as k=⌊0, 1⌋. The value deciding the range of hash address k as to the hash operation F (the value 2 in the case of FIG. 13) will be hereinafter referred to as the node hash value. The node hash value is decided depending on the size (the number of all the nodes) of the data flow program and the capacity of matching memory 3.

The program in accordance with the data flow shown in FIG. 13 is executed in data driven type information processor 300, as illustrated in FIG. 7. A data packet which stores "a" in operand data is applied to program storage unit CPS through input/output control unit QJB, and a data packet Pa1 which stores #0 for destination information and "a" for operand data is output from program storage unit. Similarly, a data packet which stores "b" for operand data is applied to program storage unit CPS through input/output control unit QJB, and a data packet Pa2 which stores #0 for destination information and "b" for operand data is output from program storage unit CPS. The data packets Pa1 and Pa2 output from program storage unit CPS are sequentially applied to firing control unit FC. Firing control unit FC inputs the applied data packet Pa1, and designates an address in matching memory 3 based on a hash address (0) obtained by subjecting the destination information #0 in the input data packet Pa1 to a hash operation F. Data in the input data packet Pa1 is written in an addressing region based on the hash address (0) in matching memory 3, and a corresponding firing detection bit PB is set to "1". Subsequently, firing control unit FC inputs the applied data packet Pa2, and obtains a hash address (0) for data packet Pa2 in a similar manner, and the content of the data packet Pa1 which has been already stored in the addressing region based on the hash address (0) in matching memory 3 is read out. At that time, as the data packets having same destination information, the firing is detected and the data packet which stores "a" and "b" for operand data is output to operation unit FP. Since operation unit FP inputs the applied data packet and subjects the input data packet to an operation processing, the data packet which stores (a+b) for the operand data is applied to program storage unit CPS from operation unit FP. Program storage unit CPS inputs the applied data packet, and provides firing control unit FC with a data packet Pa7 which stores #4 for the designation information and (a+b) for the operand data by addressing based on the destination information #0 in the input data packet. Firing control unit FC inputs the applied data packet Pa7, writes the content of the input data packet to the addressing region based on the hash address (0) of matching memory 3, and sets a corresponding firing detection bit PB to "1". Thus, the data packet Pa7 queues for input of a data packet (data packet Pa10 in FIG. 13) to be paired with the data packet Pa7.

Then, a data packet which stores "c" for operand data is applied to program storage unit CPS through input/output control unit QJB, a data packet Pa3 which stores #2 for destination information and "c" for operand data is applied from program storage unit CPS to firing control unit FC. Firing control unit FC inputs the applied data packet P3, and obtains a hash address (0) based on the destination information #2 of the input data packet Pa3. Since at that time the firing detection bit PB corresponding to the addressing region based on the hash address (0) of matching memory 3 is set to "1", the destination information #4 read out from the addressing region and the destination information #2 in the input data packet Pa3 are compared in value, and it is determined that the input data packet Pa3 has priority in queuing for data to b paired. Therefore, the destination information #4 and the operand data (a+b) read out from the addressing region are stored in the data packet Pa7 whose circulating flag fg is set to "1" is applied to operation unit FP. Meanwhile, data in the input data packet Pa3 is written in the addressing region of matching memory 3, and queues for input of data to be paired therewith.

Since its circulating flag fg is set to "1", the data packet Pa7 output from firing control unit FC passes through operation unit FP and program storage unit CPS and is applied again to firing control unit FC. Thus, when a plurality of different data packets having the same hash address in matching memory 3 collide with each other (hereinafter referred to as hash collision), the order of priority in processing between the collided data packets, in other words the order of priority in queuing is determined. Based on the result of the determination, one of the data packets is determined to be the one which can not queue in matching memory 3, and its circulating flag fg is set to "1" and output from firing control unit FC, and circulates processor 300 without undergoing any processing until the state of storage in the corresponding region in matching memory 3 is permitted for queuing. Such data packet is hereinafter referred to as circulating packet.

Now, similarly, processing of the data flow program according to the flow ,graph in FIG. 13 proceeds as each data packet including the circulating packet goes from program storage unit CPS→firing control unit FC→operation unit FP→. . . .

In the flow graph in FIG. 13 as described above, there exists a case in which different nodes allotted with pieces of instruction information which can be executed at a time take the same hash address. For example, in the flow graph in FIG. 13, nodes N4 and N2 can be executed at the same time. If the same hash address is taken by different nodes which can be executed at the same time, a circulating packet is produced with the occurrence of a hash collision in memory 3 as described above. The circulating packet is an unnecessary data packet irrelevant to an actual operation processing in data driven type information processor 300, the amount of data packets flowing the processor 300 increases by the amount of the circulating packets if such hash collision takes place. With the increase of the amount of data packets flowing the processor 300, a queue of data packets in input/output control unit QJB is increased, slowing down the speed of the data packets including the circulating packets flowing the processor 300. In other words, due to the queue in input/output control unit QJB, time required for all the data packets for flowing the processor 300 will be too long, thereby reducing the speed of program execution in processor 300.

SUMMARY OF THE INVENTION

It is an object of the invention to provide a method of controlling execution of a data flow program permitting collision in a memory at the time of data flow program execution to be avoided and the speed of program execution to be increased, and an apparatus therefor.

In order to achieve the above-described object, a method of controlling execution of a data flow program permits collision in a matching memory to be avoided in an information processor including a program storage unit, a matching memory, a paired data producing portion, and an operation unit.

The program storage unit stores a data flow program formed of a plurality of destination information and a plurality of instruction information, receives a data packet formed of a destination field, an instruction field, and a data field, reads out destination information and instruction info, nation from the data flow program by addressing based on the content of the destination field of the received data packet, stores the read out destination information and instruction information in the destination field and the instruction field of the received data packet, respectively and outputs the received data packet.

The matching memory has an address space to which an operation value produced by subjecting the destination information of the destination field of the data packet to a prescribed operation corresponds to its physical address.

The paired data producing portion receive a data packet output from the program storage unit, compares the content of the addressing region of the matching memory based on the operation value of the received data packet and the content of the received data packet, and produces and outputs the data packet which stores an operand data pair or write the content of the received data packet in the addressing region to queue for input of a data packet to be paired.

The operation unit receives the data packet output from the paired data producing portion, decodes the instruction information of the instruction field of the received data packet, subjects the content of the data field of the received data packet based on the result of decoding to operation processing, stores the operation result data in the data field of the received data packet, and outputs the received data packet.

The above-described method of controlling execution of a data flow program includes dividing a plurality of instruction information in a data flow program into a plurality of instruction information groups which can be operated in parallel, and setting to each pieces of instruction information included in each of the instruction information groups, such destination information that operation value for addressing the matching memory are different for every instruction information group. By employing such a method of controlling execution of a data flow program, data packets which store instruction information executable in parallel in the data flow program have their destination information in their destination fields so set that addresses for addressing the matching memory are different from each other, collision in the matching memory is eliminated, and a circulating packet is not produced. The speed of data packets flowing the information processor is increased by the amount of circulating packets reduced, thus increasing the speed of processing in the processor. Since no further circulating packet is produced, the amount of data packets flowing in the processor is reduced by the amount of circulating packets conventionally present, and the amount of data packets to be newly input into the information processor can be increased while maintaining a conventional processing speed, thereby improving throughput in the information processor.

In order to achieve the above-stated object, an apparatus of controlling execution of a data flow program according to the invention functions in the above-described information processor and includes a dividing unit for dividing a plurality of instruction information in a data flow program into a plurality of instruction information groups which can be operated in parallel, and a setting portion for setting destination information so that operation values for addressing the matching memory are different for every instruction information group. Therefore, according to the apparatus of controlling execution of a data flow program according to the invention, data packets storing instruction information executable in parallel in the data flow program have their destination information in their destination field so set that operation values for addressing the matching memory are different from each other, thereby eliminating collision in the matching memory, and the processing speed in the information processor increases without any unnecessary circulating packet being produced. Furthermore, the amount of data packets flowing in the information processor decreases by the amount of the decrease in the circulating packets, it will be possible to increase the amount of data packets to be newly input in the information processor while maintaining the conventional data processing speed, thus improving throughput in the information processor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Referring now to the figures, one embodiment of the invention will be described in detail.

Figure 1:
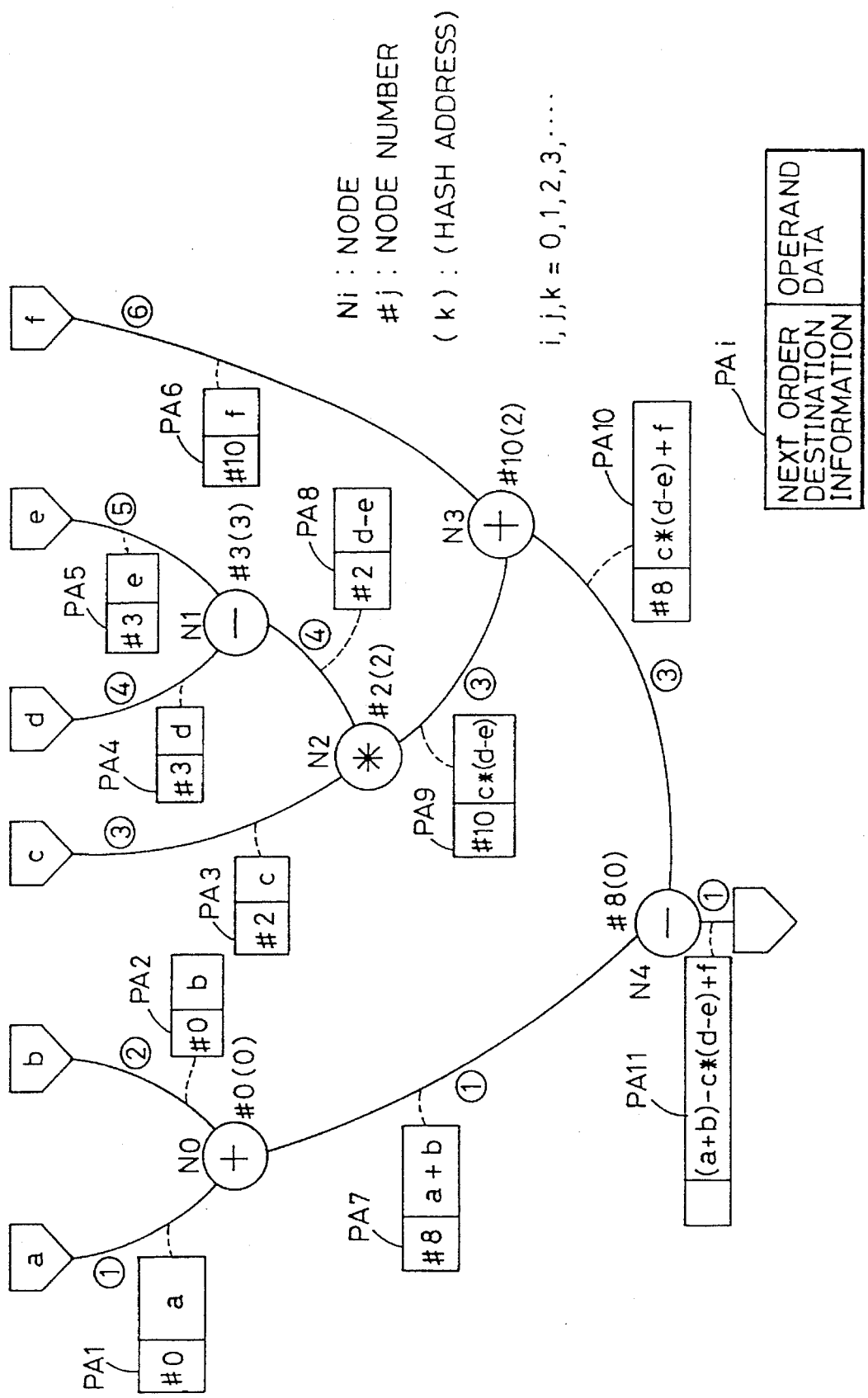
FIG. 1 illustrates one example of a flow graph obtained by analyzing the flow of a data flow program in accordance with one embodiment of the invention.
Figure 2:
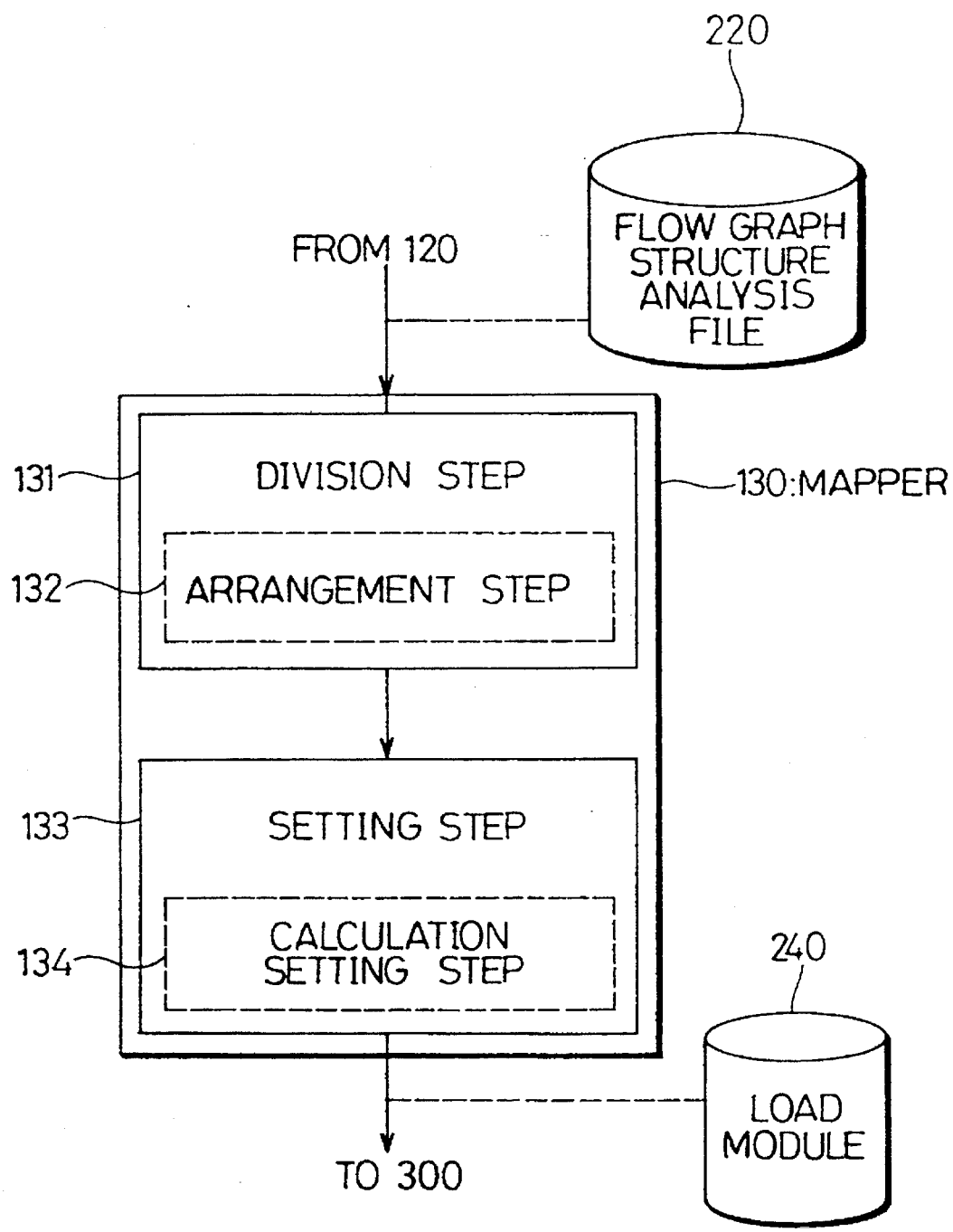
FIG. 2 illustrates the functional structure of a mapper utilized in developing a data flow program in accordance with one embodiment of the invention.
Figure 3:
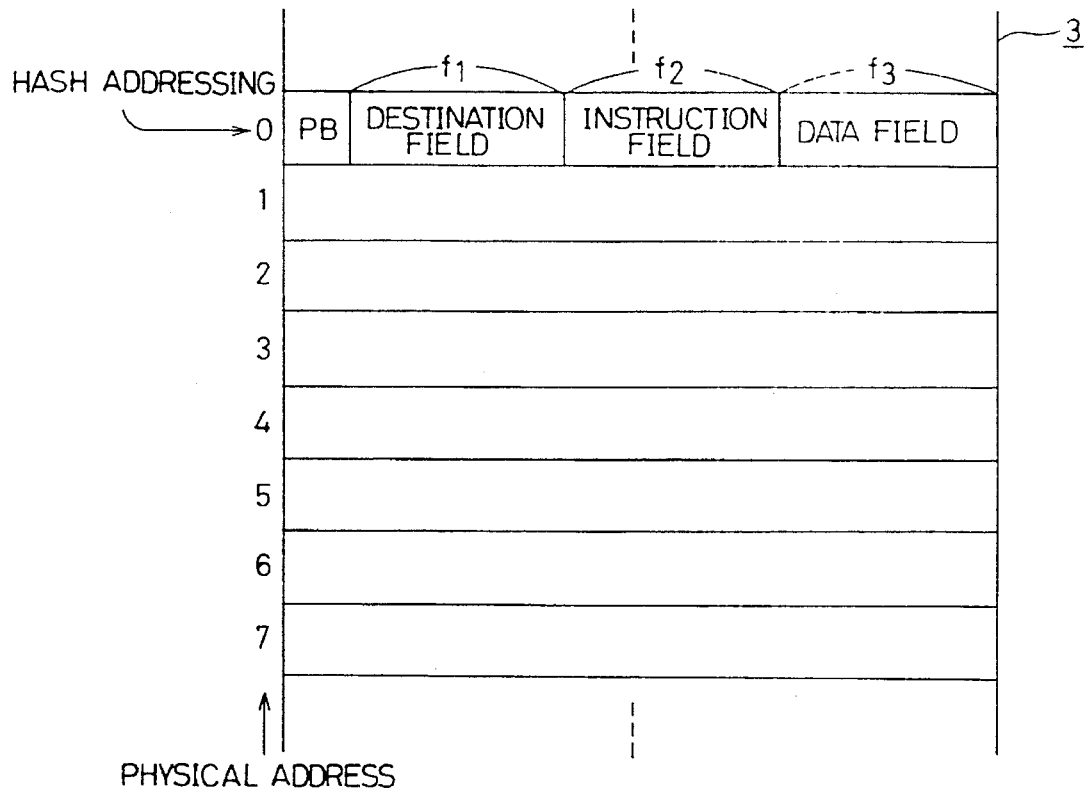
FIG. 3 illustrates the field structure of part of the storage content of a matching memory in accordance with the flow graph in FIG. 1.
Figure 4:
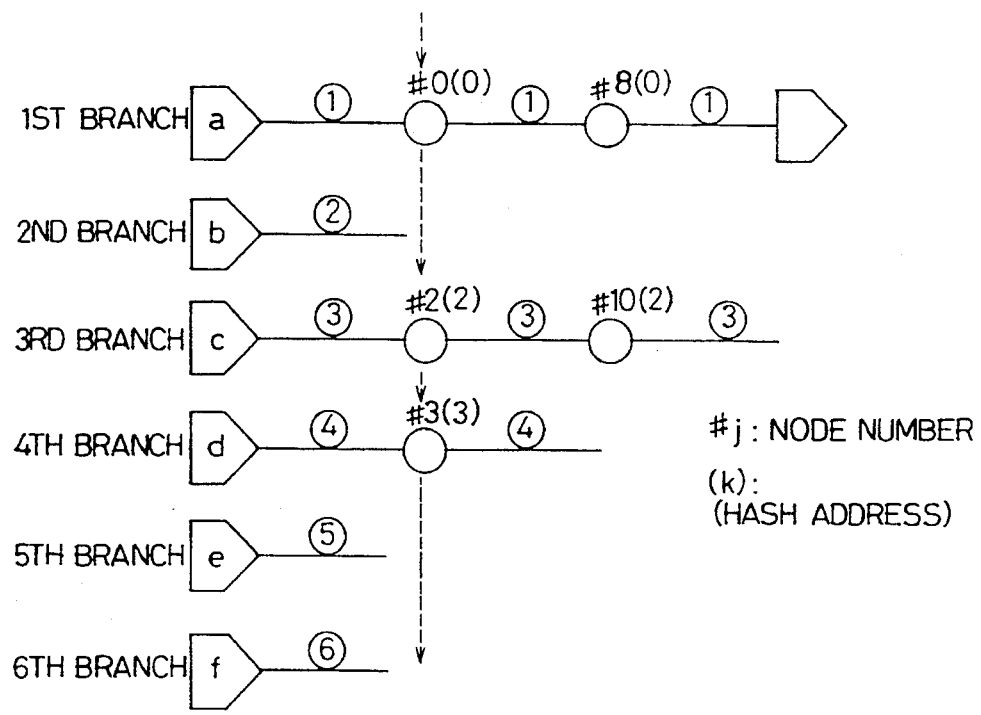
FIG. 4 illustrates a technique for attaching node numbers which takes into consideration branches in a data flow graph in accordance with one embodiment of the invention.
Figure 5:
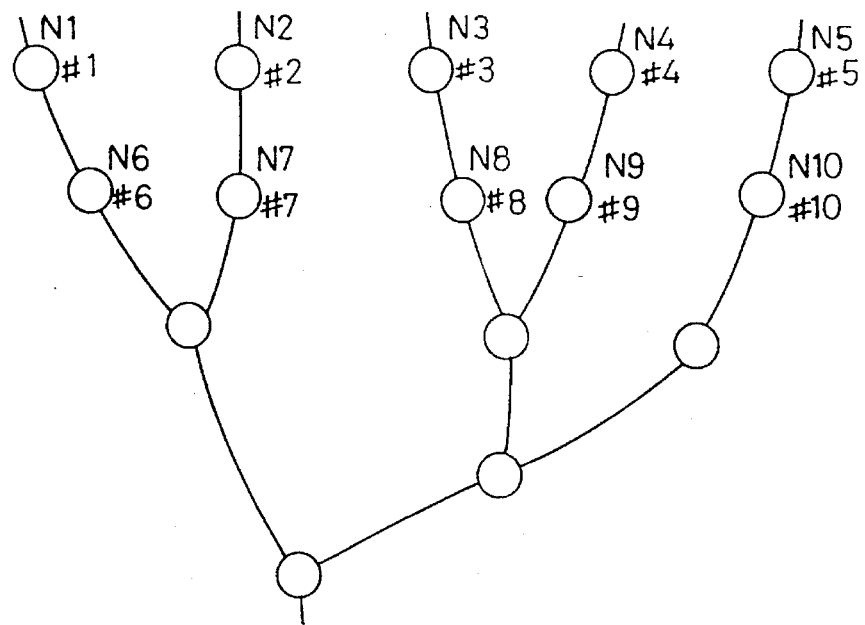
FIG. 5 illustrates a flow graph attached with node numbers utilizing a conventional method of attaching node numbers.
Figure 6:
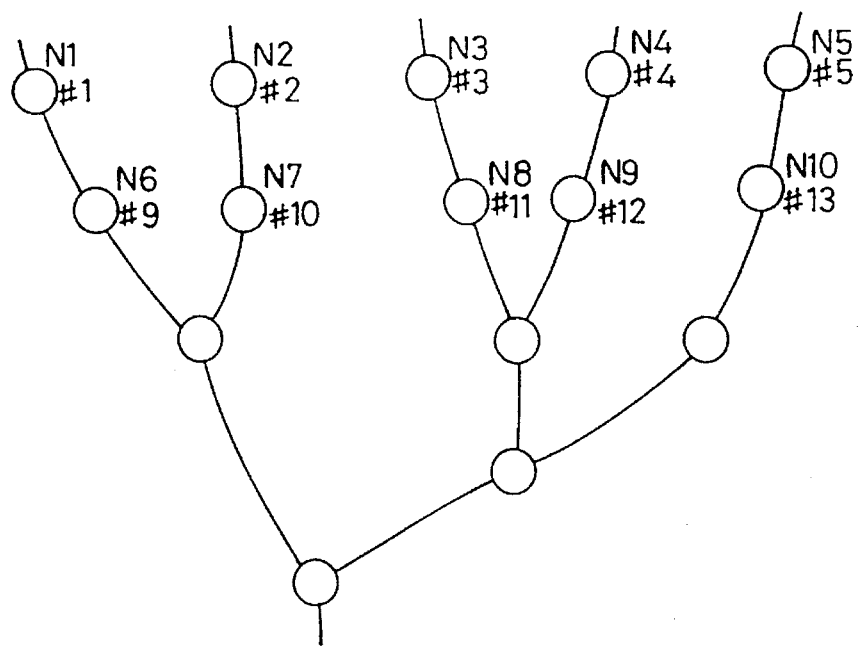
FIG. 6 is a representation showing a flow graph attached with node numbers unitizing a method of attaching node numbers in accordance with one embodiment of the invention.

FIG. 1 illustrates a flow graph obtained by analyzing the flow of a data flow program according to present embodiment. FIG. 2 schematically shows the functional structure of a mapper used for developing a data flow program in accordance with the present embodiment. FIG. 3 shows the field structure of part of storage content of matching memory in accordance with the flow graph in FIG. 1. FIG. 4 shows the technique for attaching node numbers taking into consideration branches in a data flow graph in accordance with the present embodiment. FIG. 5 shows a flow graph attached with node numbers, utilizing a conventional method of attaching node numbers. FIG. 6 shows a flow graph attached with node numbers, utilizing a method of attaching node numbers in accordance with the present embodiment.

Figure 7:
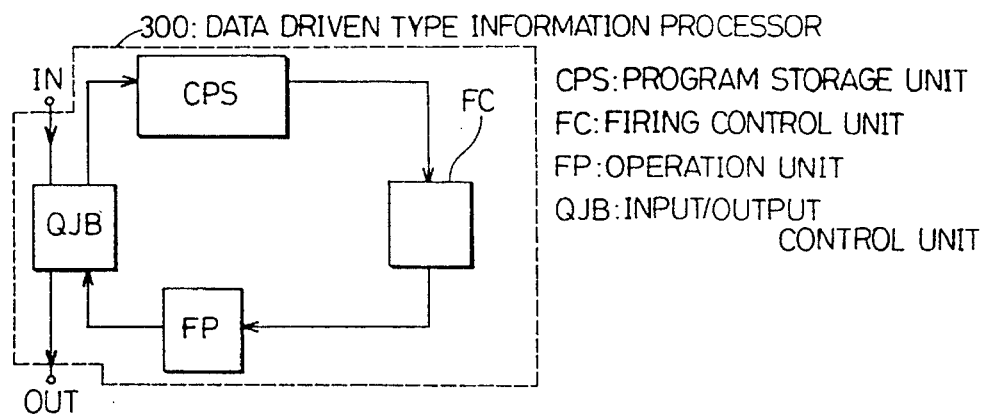
FIG. 7 is a block diagram showing a data driven type information processor applied to a conventional example and one embodiment of the invention.
Figure 8:
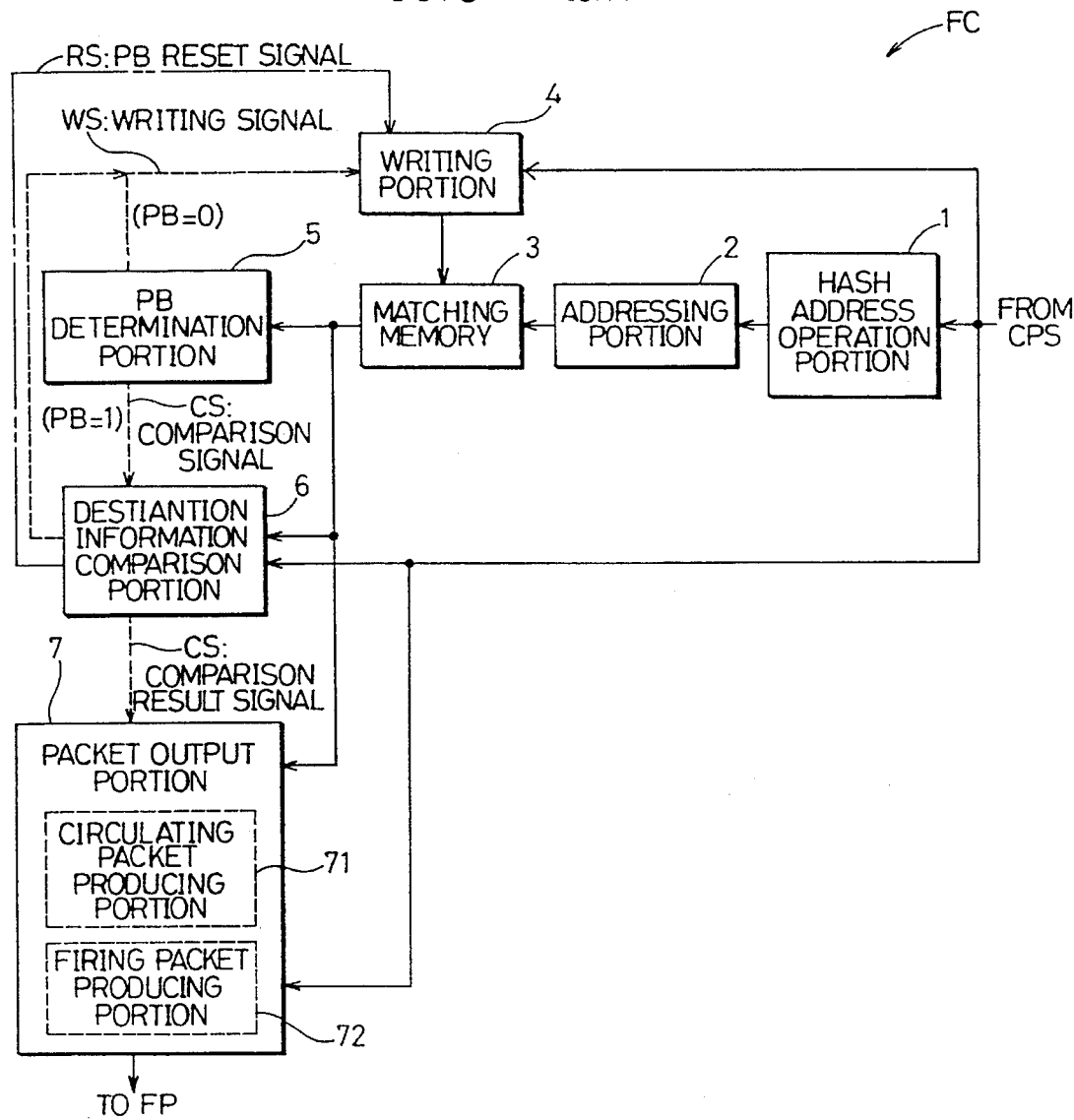
FIG. 8 is a block diagram showing a firing control unit in FIG. 7.
Figure 9:
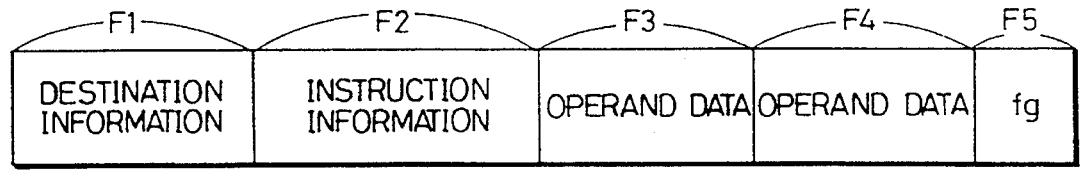
FIG. 9 illustrates the field structure of a data packet going through the data driven type information processor shown in FIG. 7.
Figure 10:
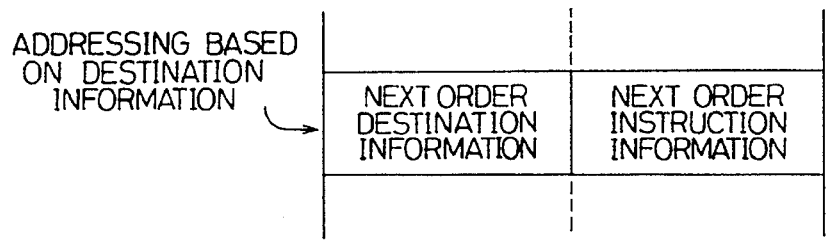
FIG. 10 illustrates the field structure of part of a program storage unit in FIG. 7.
Figure 11:
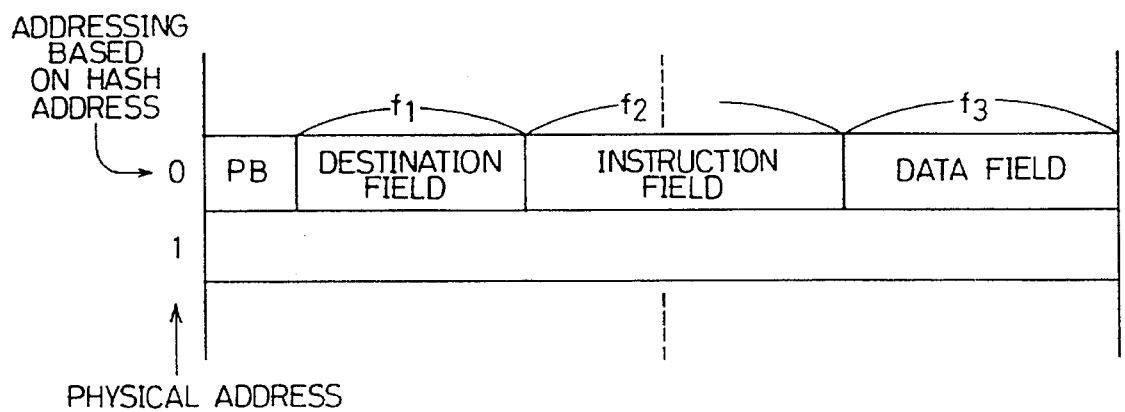
FIG. 11 illustrates the field structure of part of the storage content of a matching memory in the firing control unit in FIG. 8.

The block structure of a data driven type information processor applied to this embodiment is the same as that shown in FIG. 7, and the field structure of a program storage unit CPS is the same as that in FIG. 10. In this embodiment, as will be described later, no circulating packet is produced, the field structure of data packet according to this embodiment does not store the circulating flag fg in FIG. 9, and the field structure of the other parts of data packet is the same as that in FIG. 9. Without any circulating data packet being produced, the structure without circulating packet producing unit 71 in FIG. 8 is employed in a firing controlling unit FC. The other functional structure of firing control unit FC is the same as that shown in FIG. 8. For these reasons, details description will not be provided on the block structure of the data driven information processor and the field structure of the data packet in accordance with the embodiment.

Figure 12:
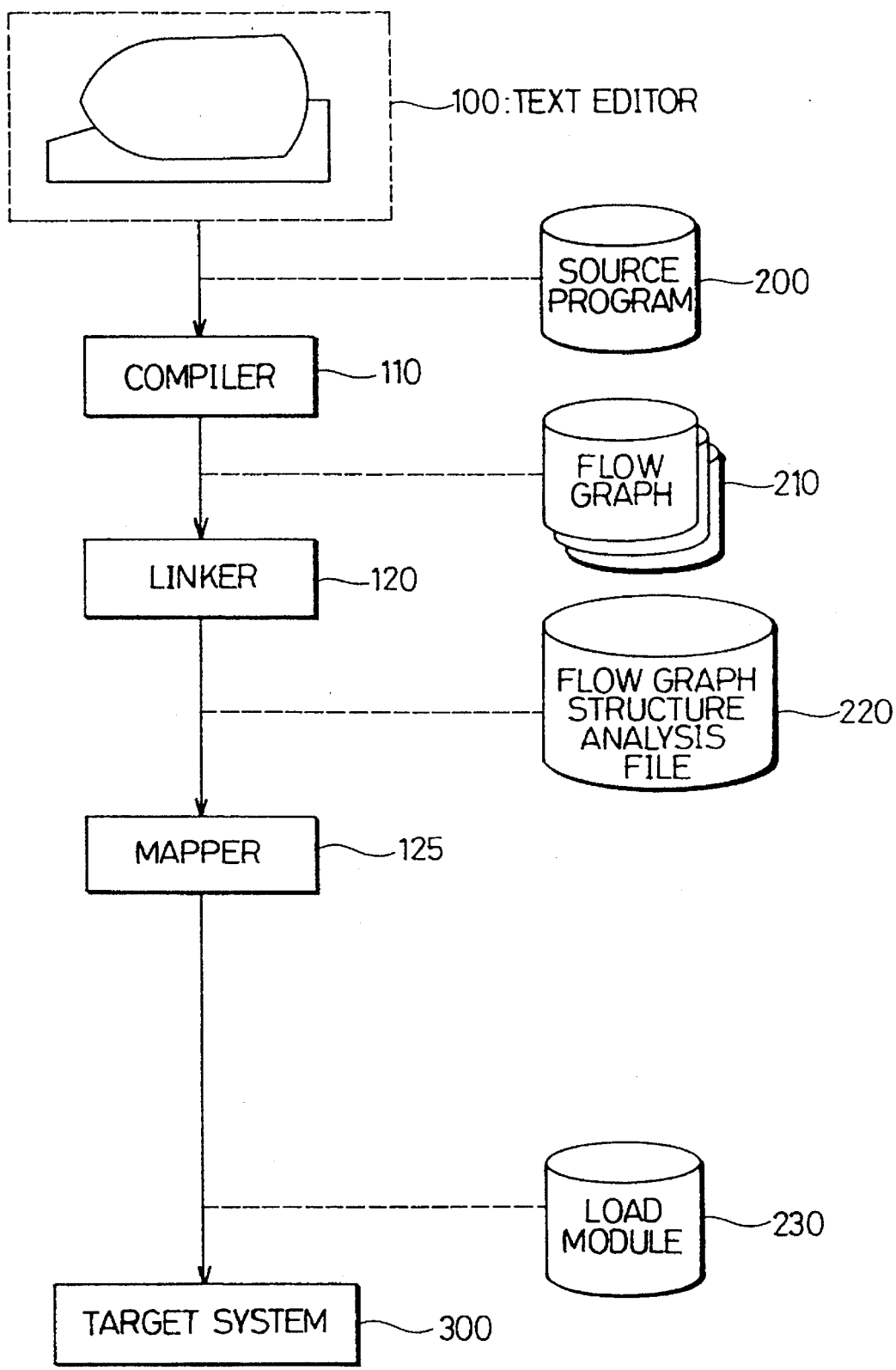
FIG. 12 schematically illustrates a procedure of developing a data flow program.

The procedure of developing a data flow program for the present embodiment will be described. The procedure of development replaces mapper 125 among the functions included in the conventional procedure of development shown in FIG. 12 by a mapper 130 shown in FIG. 2, the other functions are the same as those in FIG. 12, and therefore only mapper 130 will be described here.

As illustrated in FIG. 2, mapper 130 includes a division step 131 for dividing a flow graph in a flow graph structure analysis file 220 provided by a linker 120 into a plurality of node groups operable in parallel, and a setting step 133 for setting a node number for each node in the flow graph so that a hash address will be different for each node group divided by the step 131. The dividing step 131 further includes an arrangement step 132 for arranging the plurality of nodes included in each node group in a sequence based on the order in which operation instructions each allotted to the nodes are operated in operation unit FP. The setting step 133 further includes a calculation setting step 134 for calculating a node number whose hash address is the same for each node included in each node group and which indicates a different content. Flow graph structure analysis file 220 is processed in mapper 130 and down loaded to target system 300 as a load module 240. By this down load, the data flow program which prevents circulating packets from being produced is stored in the program storage unit CPS of data driven type information processor 300 illustrated in FIG. 7.

Referring to FIGS. 2 and 3, technique for attaching node numbers in a data flow program in accordance with one embodiment of the invention will be described. FIG. 4 is a chemical representation showing the connection between nodes in the flow graph in FIG. 13. Taking into account each input node for inputting data in FIG. 13, a set of nodes obtained by a data packet sequentially following instruction nodes through which it passes after the input node will be referred to as a branch. The branch is initiated from the input node or a node from which other branches are divided and terminates at the last node of the flow graph or the node which encounters another branch. The branches of the flow graph are attached with numbers sequentially from the upper left to the lower right of the flow graph. These numbers are called branch numbers. When branch numbers are given to the flow graph in FIG. 13, as illustrated in FIG. 4, branch numbers ① to ⑥ are sequentially attached to a first branch including a node to input data "a" to a sixth branch including a node to input data "f". Extraction of branches in this flow graph is performed by the dividing step 131 illustrated in FIG. 2. The dividing step 131 divides the flow graph in FIG. 13 input as the flow graph structure analysis file 220 into six node groups represented by the first to sixth branches as shown in FIG. 3. The divided node groups are node groups operable in parallel. More specifically, instruction information allotted to a node group included in the first branch is instruction information which can be operated independent of the result of operation of instruction information allotted to a node group included in the third branch. The arrangement step 132 arranges nodes included in a node group extracted by the dividing step 131 in a sequence based on the order in which instruction information allotted thereto are to be operated.

A node number to each node is attached as follows taking into account branches. The node number is attached by the setting step 133 shown in FIG. 2. The setting step 133 produces 0, 1, 2, ..., 6, 7 as the range of hash address k, based on the node hash value (=8) and hash operation F. The setting step 133 processes so that different hash addresses are allotted to the first to sixth branches based on the range of for hash address k. More specifically, the setting step 133 attaches node numbers #j to all the nodes belonging to the first branch so that they are allotted with hash address (0). Similarly, each node included in the second branch is attached with a node number j so that hash address (1) is allotted to each node. Similarly, node numbers #j are attached to nodes belonging to each branch so that different hash addresses are allotted to each branch. The calculation setting step 134 attaches different node numbers #j having the same hash address k to the nodes included in each branch. The way of attaching a node number to each node by the setting step 133 and the calculation setting step 134 will be described.

Figure 13:
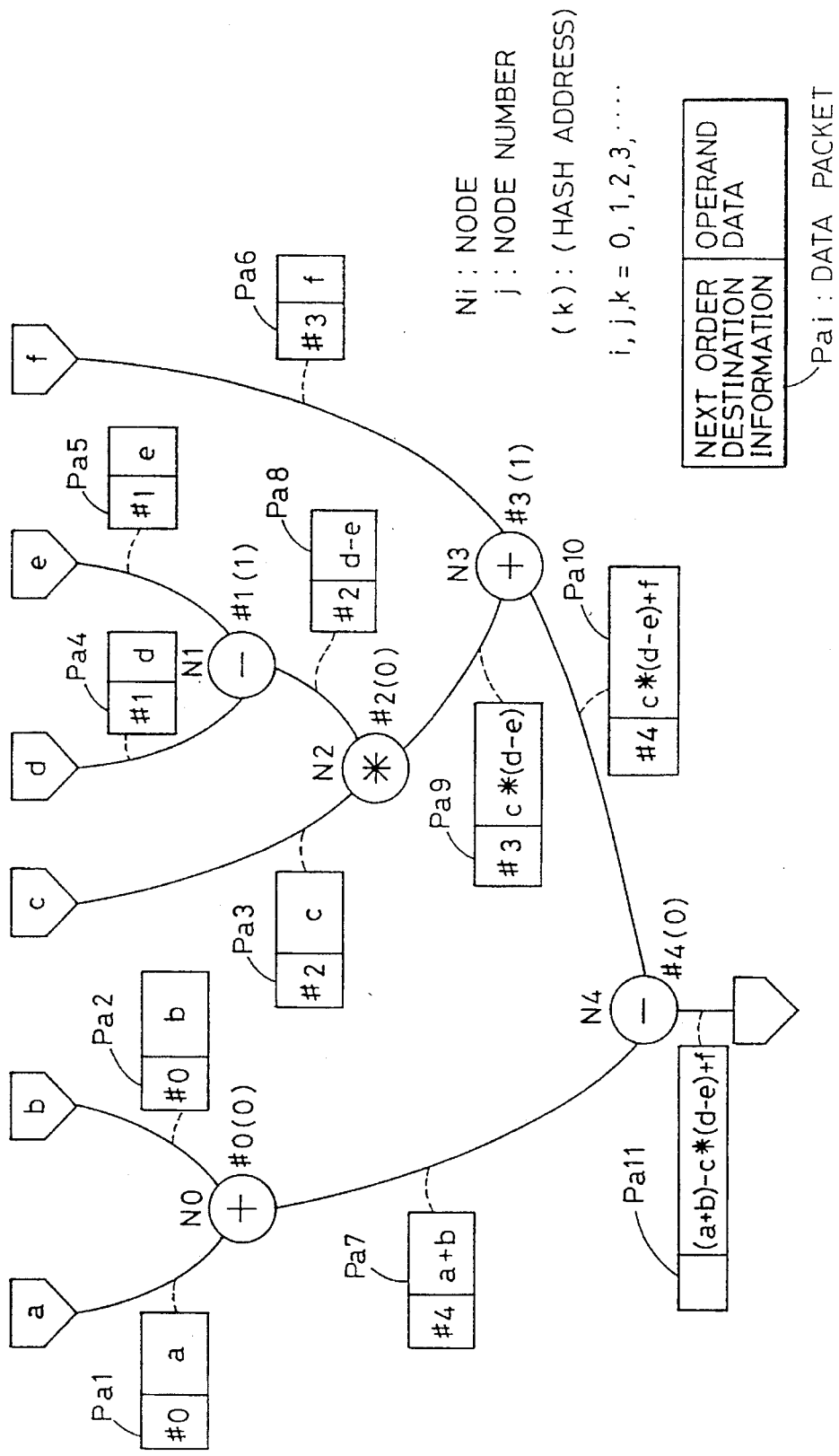
FIG. 13 illustrates one example of a conventional flow graph obtained by analyzing the flow of a data flow program utilizing the procedure of development shown in FIG. 12.

The head node in each branch (exclusive of an input node for inputting data) is attached with a node number starting from 0 increasing by one in the order of branch numbers. In FIG. 4, a node number #0 is attached to the head node of the first branch, and although the second branch does not have a head node, its node number itself is added with 1. The node number is further added with 1 and the head node in the third branch is given node number #2, the node number is further added with 1 and the head node in the fourth branch is given node number #3. Although the next fifth and sixth branches do not have a head node, the node numbers are each further added with 1. Now, the next node following the head node in each branch (the second node) is attached with a node number in the order of branch numbers. A second node in each branch is given the value of the node immediately before a corresponding one, in other words the value of the node number of a corresponding head node plus a node hash value. In FIG. 13, node numbers 8 and #10 are given to the second node in the first branch and the second node in the third branch, respectively as illustrated in FIG. 4. As to the next node (third node) following the second node in each branch, the value of the node immediately before a corresponding one to the third node, in other words the value of the node number of a corresponding second node plus a node hash value is given. Similarly, as to each node exclusive of the head node of each branch, the value of the node number immediately before a corresponding one plus a node hash value is given as a node number. In this manner, when a node number is given to each node, the value of hash address in each node become common for each branch as illustrated in FIG. 4, while the values of hash addresses are different between the branches. In FIG. 4, the hash address of the first branch is 0, that of the second branch is 1, the third branch 2, the fourth branch 3, the fifth branch 4, . . . , and the eighth branch 7. Assuming that there exists a ninth branch, its hash address is 0 and the same as that of the first branch, in that case, the node hash value is changed to 9, and as is the case with the foregoing, a node number is given to each node by the setting step 133 and the calculation setting step 134. As described above, when a node number is given based on branch and node hash value, the node hash value is desirably at least larger than the maximum value of the number of the branches of a flow graph, in other words larger than the maximum value of the number of instruction node groups operated in parallel and yet smaller than the maximum value represented by the physical address of memory 3. The node hash value in the flow graph is decided using as reference the maximum value for the number of branches of the flow graph or the dimension of the address space of matching memory 3 as described above, but it can generally take any value in the range from 128 to 256, and therefore in the case of a usual flow graph, changing a node hash value as described above and giving a node number once again is most unlikely.

A flow graph attached with node numbers utilizing a conventional method is in. FIG. 5. Referring to FIG. 5, node numbers are given to nodes sequentially from the upper left to the lower right of the flow graph irrespective of branches. Assuming that the node hash value=8, in the flow graph of FIG. 5, for example there is the possibility that hash collision takes place between node N1 with node number #1 and node N9 with node number #9, or between node N2 with node number #2 and node N10 with node number #10. More specifically, instruction nodes included in different branches can be operated in parallel, and if node numbers taking the same hash address are employed between different branches, a hash collision results.

Meanwhile, a flow graph permitting such hash collision illustrated in FIG. 6 to be avoided is obtained when the flow graph in FIG. 5 is attached with node numbers taking into account branches, in other words taking into node groups which can be operated in parallel in accordance with the present embodiment. Referring to FIG. 6, assuming that the node hash value=8, the relation between nodes causing the hash collision in FIG. 5 always appears in the same branch and therefore no hash collision takes place. More specifically, in FIG. 5, nodes N1 and N9 belong to different branches and yet have the same hash address (1), which can cause a hash collision. In FIG. 6, having different hash addresses, nodes N1 and N9 will not cause a hash collision and a hash collision will not take place between nodes N1 and N6 having the same hash address (1). More specifically, instruction information allotted to node N6 is executed in response to the result of execution of instruction information in node N1 and therefore a hash collision will not take place. Stated differently, a data packet related to node N6 is provided from program storage unit CPS to firing control unit FC only when a data packet related to node N1 is fired at firing control unit FC and operated in operation unit FP. This means that data packets having the same hash address do not exist at the same time in data driven type information processor unit 300. The relation between nodes N1 and N6 similarly applies to the relations between node N2 and N7, nodes N3 and N8, nodes N4 and N9, and nodes N5 and N10.

As described above, according to the way of attaching node numbers in accordance with the present embodiment, data packets having the same hash address do not exist at the same time in data driven type information processor unit 300, and therefore a hash collision in matching memory 3 is eliminated. Accordingly, no circulating packet is produced in data driven type information processor 300, and therefore the amount of data packets going through information processor 300 does not increase, thereby increasing program execution speed by the amount.

Now, operation a=the time of program execution in accordance with a flow graph attached with node numbers taking into account branches in data driven type information processor 300 will be described in conjunction with FIG. 1. The program according to the flow graph in FIG. 1 is the same as the program according to the flow graph illustrated in FIG. 13. The branches of the flow graph in FIG. 1 are attached with branch numbers ①– ⑥, with a node number #j being attached to node Ni in each branch in the above-stated manner so as to avoid hash collision. It is assumed that the hash address operation portion 1 performs a hash operation F based on the node hash value=8, and produces a hash address. It is also assumed that the firing detection bits PB of matching memory 3 are all set to 0.

A data packet storing "a" for the operand data and a data packet storing "b" for the operand data are provided to program storage unit CPS through input/output control unit QJB, and the data packet PA1 which stores #0 for the destination information and "a" for the operand data and the data packet PA2 which stores #0 for the destination information and "b" for the operand data are sequentially provided to firing control unit FC. Firing control unit FC, in response to the input of two different data packets PA1 and PA2 having the same destination information (#0), detects a firing, and applies the data packet which stores "a" and "b" for the operand data to operation unit FP. Operation unit FP performs an operation to the applied data packet, applies the data packet which stores (a+b) for operand data to program storage unit CPS, and a data packet PA7 which stores #8 for destination information and (a+b) for the operand data is applied from program storage unit CPS. Firing control unit FC inputs the applied data packet PA7, writes the data of the input data packet PA7 in matching memory 3 by addressing based on the hash address (0), and sets a firing detection bit PB corresponding to the addressing region to 1. Thus, the data packet PA7 queues for input of data to be paired therewith (data packet PA 10 in FIG. 1).

Then, a data packet which stores "c" for the operand data is applied to program storage unit CPS through input/output control unit QJB, and a data packet PA3 which stores #2 for destination information and "c" for the operand data is applied from program storage unit CPS to firing control unit FC. Firing control unit FC inputs the applied data packet PA3, and writes the data of the input data packet PA3 in matching memory 3 by addressing based on the hash address (2), and sets a firing detection bit PB corresponding to the addressing region to 1. Thus, the data packet PA3 queues for input of data to be paired therewith (data packet PA8 in FIG. 1) in matching memory 3.

Then, a data packet which stores "d" for the operand data and a data packet which stores "e" for the operand data are applied to program storage unit CPS through input/output control unit QJB, and a data packet PA4 which stores #3 for the destination information and "d" for the operand data and a data packet PA5 which stores #3 for the destination information and "e" for the operand data are sequentially provided from program storage unit CPS to firing control unit FC. Firing control unit FC inputs the two different data packets PA4 and PA5 having the same destination information, detects a firing in response, and applies a data packet which stores "d" and "e" for the operand data to operation unit FP. Operation unit FP inputs the data packet applied from firing control unit FC, performs an operation to the input data packet, and applies a data packet which stores (d–e) for the operand data to program storage unit CPS. Program storage unit CPS inputs the applied data packet, and applies a data packet PA8 which stores #2 for the next order destination information and (d–e) for the operand data. Firing control unit FC inputs the applied data packet PA8, and PB determination portion 5 detects the data packet PA3 already stored in matching memory 3 being in a non-firing state by addressing based on hash address (2) in response to the input. At that time, destination information comparison portion 6 determines that the data packet PA8 and the packet PA3 agree in their destination information and applies a comparison result signal CR to packet output portion 7, firing packet producing portion 72 in response produces a data packet=which stores "c" and (d–e) for the operand data and applies the same to operation unit FP. At that time, a firing detection bit PB corresponding to the addressing region of matching memory 3 is set to 0. Operation unit FP inputs the data packet applied from firing packet producing portion 72, subjects the same to an operation, and applies a data packet which stores c*(d–e) for the operand data to program storage unit CPS. Program storage unit CPS inputs the data packet applied from operation unit FP, and applies in response a data packet PA9 which stores #10 for the destination information and C*(d–e) for the operand data to firing control unit FC. Firing control unit FC inputs the applied data packet PA9, writes the data of the input data packet PA9 in matching memory 3 by addressing based on the hash address (2), and sets a corresponding firing detection bit PB to 1. Thus, the data packet PA9 queues for input of data to be paired therewith (data packet PA6 in FIG. 1) in matching memory 3.

Then, a data packet which stores "f" for the operand data is applied to program storage unit CPS through input/output control unit QJB, and a data packet PA6 which stores #10 for the destination information and "f" for the operand data is applied to firing control unit FC. Firing control unit FC inputs the applied data packet PA6, and detects the data packet PA9 being in a non firing state in matching memory 3 by addressing based on the hash address (2). Firing packet producing portion 72 produces a firing packet based on the data packet PA6 and the data packet PA9, and applies a data packet which stores "f" and c*(d– e) for the operand data to operation unit FP. Operation unit FP inputs the data packet applied from firing packet producing portion 72, subjects the same to an operation, and applies a data packet which stores c*(d–e)+f for the operand data to program storage unit CPS. Program storage unit CPS inputs the data packet applied from operation unit FP, and applies a data packet PA10 which stores #8 for the destination information and c*(d–e)+f for the operand data to firing control unit FC. Firing control unit FC inputs the data packet PA10 applied from program storage unit CPS, and detects the data packet PA7 being in a non-firing state in matching memory 3 by addressing based on the hash address (0). Destination information comparison portion 6 detects a firing in response to the data Racket PA10 and data packet PA7 having the same destination information, applies a comparison result signal CR to firing packet producing portion 72 to produce a firing packet based on the data packets PA7 and PA10. A data packet which stores (a+b) and c*(d–e)+f for the operand data is applied to operation unit FP from firing packet producing portion 72. Operation unit FP inputs the data packet applied from firing packet producing portion 72 and subjects the same to an operation, and applies a data packet PA11 which stores (a+b)–c*(d–e)+f for the operand data to input/output control unit QJB. Input/output control unit QJB inputs the data packet PA11, and outputs it selectively to one of program storage unit CPS and output terminal OUT.

As in the foregoing, if a program is executed in accordance with the flow graph shown in FIG. 1 even if it is the same program, hash collision as illustrated in FIG. 13 will not take place and therefore unnecessary circulating packets are eliminated. Therefore, the amount of data packets flowing in information processor 300 per unit time is reduced by the amount of the decrease of unnecessary circulating packets. This also permits increase of the amount of data to be newly input into information processor 300 per unit time while maintaining its processing speed, and therefore throughput in processor 300 increases.

In the above-described embodiments, although the branch numbers are attached sequentially from the left side of the flow graph, the branch numbers may be attached at random. The hash addresses are attached in the order of the branch numbers if a separate hash address is attached for each branch, the order of attaching is not specified to the order illustrated in conjunction with the embodiment.

Also in the above-described embodiment, matching memory 3 is accessed in accordance with a hash address based on destination information, if a data packet includes a generation number for identifying each of the data packet groups including a plurality of data packets, hash collision can be avoided by subjecting the generation number and destination information to a hash operation and accessing matching memory 3 in accordance with the resultant hash address.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. For application to a data driven processor, the data driven processor including:

program storage means for (i) storing a data flow program including a plurality of destinations and a plurality of instructions, (ii) receiving a data packet including a destination field, an instruction field, and a data field, (iii) reading destination information and instruction information from the data flow program by addressing based on contents of the destination field of the data packet, (iv) storing the destination information and instruction information read from the data flow program in the destination field and the instruction field of the data packet, respectively, and (v) outputting the data packet;

a matching memory for which an operation value associated therewith, produced by subjecting the destination information of the destination field of the data packet to a prescribed operation, corresponds to a physical address dictated by the destination information of the destination field of the data packet;

paired data generation means for (i) receiving the data packet output from said program storage means, (ii) comparing contents of an addressing region of said matching memory based on the operation value and contents of the received data packet, and (iii) in response to a result of said comparison, producing and outputting a data packet which stores an operand data pair or writing contents of the received data packet in the addressing region, thereby queuing for receipt of a data packet to be paired therewith; and operation means for (i) receiving the data packet output from said paired data generating means, (ii) decoding instruction information of the instruction field of the received data packet, (iii) subjecting contents of the data field of the received data packet to operation processing based on decoded instruction information, (iv) storing a result of the operation processing in the data field of the received data packet, and (v) outputting the received data packet, a mapping method for preventing data packet collision that can otherwise occur during execution of the data flow program, the method producing a mapped version of the data flow program, comprising the computer-implemented steps of:

(a) dividing the plurality of instructions in said data flow program into a plurality of instruction groups N to be operated on in parallel, the groups being operable in parallel due to operand independence; and (b) setting said destination information as a function of N, N≧2, the number of instruction groups, for each instruction included in each of said instruction groups so that an operation value determined for each instruction within an instruction group is the same for all instructions within the instruction group and yet is different for each of said instruction groups;

the data driven processor executing the mapped version of the data flow program according to the destination information determined in step (b) such that data packet collisions that would otherwise occur are eliminated.

2. The method of claim 1, wherein said dividing step further includes the sub-step:

(a)(1) arranging instructions included in each of said instruction information groups in a sequence according to an order in which the plurality of instructions are to be performed in said operation means.

3. The method of claim 2, wherein said setting step further includes the sub-step of:

(b)(1) calculating and setting destination information which address different regions of said program storage means and have a same operation value to each instruction in each of said instruction information groups.

4. The Method of claim 3, wherein the prescribed operation is a remainder operation having a domain including all values of the destination information and having a modulus equal to or less than a number of the instruction information groups and equal to or less than a maximum value of the physical address.

5. The Method of claim 2, wherein the prescribed operation is a remainder operation having a domain including all values of the destination information and having a modulus equal to or greater than a number of the instruction information groups and equal to or less than a maximum value of the physical address.

6. The method of claim 1, wherein said setting step further includes the sub-step:

(b)(1) calculating and setting destination information, which address different regions of said program storage means and have a same operation value, for each instruction in each of said instruction information groups.

7. The Method of claim 6, wherein the prescribed operation is a remainder operation having a domain including all values of the destination information and having a modulus equal to or less than a number of the instruction information groups and equal to or less than a maximum value of the physical address.

8. Method of claim 1, wherein the prescribed operation is a remainder operation having a domain including all values of the destination information and having a modulus equal to or greater than a number of the instruction information groups and equal to or less than a maximum value of the physical address.

9. A mapping apparatus for preventing data packet collision that can otherwise occur during execution of a data flow program in a data driven processor, said data driven processor, the mapping apparatus producing a mapped version of the data flow program, said data driven processor including:

program storage means for (i) storing a data flow program including a plurality of destinations and a plurality of instructions, (ii) reciting a data packet including a destination field, an instruction field, and a data field, (iii) reading destination information and instruction information from the data flow program by addressing based on contents of the destination field of the data packet, (iv) storing the destination information and instruction information read from the data flow program in the destination field and instruction field, respectively, of the data packet, and (v) outputting the data packet;

a matching memory for which an operation value associated therewith, produced by subjecting the destination information of the destination field of the data packet to a prescribed operation, corresponds to a physical address dictated by the destination information of the destination field of the data packet;

paired data generation means for (i) receiving the data packet output from said program storage means, (ii) comparing contents of an addressing region of said matching memory based on the operation value and contents of the received data packet, and (iii) in response to a result of said comparison, producing and outputting a data packet which stores an operand data pair or writing contents of the received data packet in the addressing region, thereby queuing for receipt of a data packet to be paired therewith; and operation means for (i) receiving the data packet output from said paired data generating means, (ii) decoding instruction information of the instruction field of the received data packet, (iii) subjecting contents of the data field of the received data packet to operation processing based on decoded instruction information, (iv) storing a result of the operation processing in the data field of the received data packet, and (v) outputting the received data packet, said mapping apparatus comprising:

dividing means for dividing said plurality of instructions in said data flow program into a plurality of instruction information groups N, N 2, to be operated on in parallel, the groups being operable in parallel due to operand independence; and setting means for setting said destination information as a function of N, the number of instruction groups, for each instruction included in each of said instruction groups so that an operation value determined for each instruction within an instruction group is the same for all instructions within the instruction group and yet is different for each of said instruction groups;

the data driven processor executing the mapped version of the data flow program according to the destination information determined by the setting means of the mapping apparatus such that data packet collisions that would otherwise occur are eliminated.

10. The apparatus of claim 9, wherein said dividing means further includes:

arrangement means for arranging instructions included in each of said instruction information groups in a sequence according to an order in which the plurality of instructions are to be performed in said operation means.

11. The apparatus of claim 10, wherein said setting means further includes:

calculation setting means for calculating and setting destination information which address different regions of said program storage means and have a same operation value to each instruction in each of said instruction information groups.

12. The apparatus of claim 11, wherein the prescribed operation is a remainder operation having a domain including all values of the destination information and having a modulus equal to or greater than or less than maximum value of the physical address.

13. The apparatus of claim 10, wherein the prescribed operation is a remainder operation having a domain including all values of the destination information and having a modulus equal to or greater than a number of the instruction information groups and equal to or less than a maximum value of the physical address.

14. The apparatus of claim 9, wherein said setting means further includes:

calculation setting means for calculating and setting destination information which address different regions of said program storage means and have a same operation value for each instruction for each of said instruction information groups.

15. The apparatus of claim 14, wherein the prescribed operation is a remainder operation having a domain including all values of the destination information and having a modulus equal to or greater than a number of the instruction information groups and equal to or less than a maximum value of the physical address.

16. The apparatus of claim 9, wherein the prescribed operation is a remainder operation having a domain including all values of the destination information having a modulus equal to or greater than a number of the instruction information groups and equal to or less than a maximum value of the physical address.

17. A mapping method of preventing data packet collision that can otherwise occur during execution of a data flow program in a data driven processor, the data driven processor including:

program storage means for (i) storing a data flow program including a plurality of destinations and a plurality of instructions, (ii) receiving a data packet including a destination field, an instruction field, and a data field, (iii) reading destination information and instruction information from the data flow program by addressing based on contents of the destination field of the data packet, (iv) storing the destination information and instruction information read, from the data flow program in the destination field and the instruction field of the data packet, respectively, and (v) outputting the data packet;

a matching memory for which an operation value associated therewith, produced by subjecting the destination information of the destination field of the data packet to a prescribed operation, corresponds to a physical address dictated by the declination information of the destination field of the data packet;

paired data generation means for (i) receiving the data packet output from said program storage means, (ii) comparing contents of an addressing region of said matching memory based on the operation value and contents of the received data packet, and (iii) in response to a result of said comparison, producing and outputting a data packet which stores an operand data pair or writing contents of the received data packet in the addressing region, thereby queuing for receipt of a data packet to be paired therewith; and operation means for (i) receiving the data packet output from said paired data generating means, .(ii) decoding instruction information of the instruction field of the received data packet (iii) subjecting contents of the data field of the received data packet to operation processing based on decoded instruction information, (iv) storing a result of the operation processing in the data field of the received data packet, and (v) outputting the received data packet;

the mapping method producing a mapped version of the data flow program, comprising the computer-implemented steps of:

(a) dividing a flow graph, generated from the data flow program, into a plurality of node groups N, N≧2, each of the plurality of node groups including nodes which are to be operated upon in parallel, the nodes being operable in parallel due to operand independence; and (b) setting a node number as a function of N, the number of node groups, for each node in the flow graph, such that a hash address determined for each node within each of the plurality of node groups is the same within a particular group but is different for each group;

the data driven processor executing the mapped version of the data flow program according to the node numbers determined in step (b) such that data packet collisions that would otherwise occur are eliminated.

18. The method of claim 17, said step (a) further including the sub-step of (a)(1) arranging each of the nodes in the plurality of node groups in a sequence based on an order in which each of the nodes will be operated on.

19. The method of claim 17, said step (b) further including the sub-step of (b)(1) setting the node number for each node in a particular node group of the flow graph by adding a value of an immediately preceding node in the particular node group to a hash value, such that each node in the particular group has the same hash address.

20. The method of claim 19, wherein the head node of each of the plurality of node groups are assigned sequentially.

21. The method of claim 19, wherein, when each node in each of the plurality of node groups has the same hash value and each of the plurality of node groups has a different hash value, no hash collision can occur.

22. The method of claim 17, further comprising the steps of:

(c) storing the flow graph including a plurality of destinations and a plurality of instructions, (d) receiving a data packet including a destination field, an instruction field, and a data field, (e) reading destination information and instruction information from the data flow graph by addressing based on contents of the destination field of the data packet, and (f) storing the read destination information and instruction information in the destination field and the instruction field of the data packet, respectively, and outputting the data, wherein an operation value produced by subjecting the destination information of the destination field of the data packet to a prescribed operation corresponds to a physical address of the destination information of the destination field of the data packet.

23. The method of claim 22, wherein the prescribed operation in said step (f) is a remainder operation having a domain including all values of the destination information and having a modulus equal to or greater than a number of the plurality of node groups and equal to or less than a maximum value of the physical address.

24. A method as in claim 17, further comprising:

(c) assigning a hash address to a specific node by applying modulo N arithmetic to the specific node's number.

25. A mapping apparatus for preventing data packet collision than can otherwise occur during execution of a data flow program in a data driven processor, the data driven processor including:

program storage means for (i) storing a data flow program including a plurality of destinations and a plurality of instruction, (ii) receiving a data packet including a destination field, an instruction field, and a data field, (iii) reading destination information and instruction information from the data flow program by addressing based on contents of the destination field of the data packet, (iv) storing the destination information and instruction information read from the data flow program in the destination field and the instruction field, respectively, of the data packet, and (v) outputting the data packet;

a matching memory for which an operation value associated therewith, produced by subjecting the destination information of the destination field of the data packet to a prescribed operation, corresponds to a physical address dictated by the destination information of the destination field of the data packet;

paired data generation means for (i) receiving the data packet output from said program storage means, (ii) comparing contents of an addressing region of said matching memory based on the operation value and contents of the received data packet, and (iii) in response to a result of said comparison, producing an outputting a data packet which stores an operand data pair or writing contents of the received data packet in the addressing region, thereby queuing for receipt of a data packet to be paired therewith; and operation means for (i) receiving the data packet output from said paired data generating means, (ii) decoding instruction information of the instruction field of the received data packet, (iii) subjecting contents of the data field of the received data packet to operation processing based on decoded instruction information, (iv) storing a result of the operation processing in the data field of the received data packet, and (v) outputting the received data packet;

the mapping apparatus producing a mapped version of the data driven program, comprising:

dividing means for dividing a flow graph, generated from the data flow program, into a plurality of node groups N, N≧2, each of the plurality of node groups including nodes which are to be operated upon in parallel, the nodes being operable in parallel due to operand independence; and setting means for setting a node number as a function of N, the number of node groups, for each node in each of the plurality of node groups in the flow graph, such that a hash address determined for each node within each of the plurality of node groups is the same within a particular group but is different for each group;

the data driven processor executing the mapped version of the data flow program according to the node numbers determined by the setting means of the mapping apparatus such that data packet collisions that would otherwise occur are limited.

26. The apparatus of claim 25, said dividing means further including, arranging means for arranging each of the nodes in the plurality of node groups in a sequence based on an order in which each of the nodes will be operated on.

27. The apparatus of claim 25, said setting means further including, calculation setting means for setting the node number for each node in a particular node group of the flow graph by adding a value of an immediately preceding node in the particular node group to a hash value, such that each node in the particular group has the same hash address.

28. The apparatus of claim 27, wherein the head node of each of the plurality of node groups are assigned sequentially.

29. The apparatus of claim 27, wherein, when each node in each of the plurality of node groups has the same hash value and each of the plurality of node groups has a different hash value, no hash collision can occur.

30. The apparatus of claim 25 said information processor including, program storage means for (i) storing the flow graph including a plurality of destinations and a plurality of instructions, (ii) receiving a data packet including a destination field, an instruction field, and a data field, (iii) reading destination information and instruction information from the data flow graph by addressing based on contents of the destination field of the data packet, (iv) storing the read destination information and instruction information in the destination field and the instruction field of the data packet, respectively, and (v) outputting the data, and a matching memory wherein an operation value produced by subjecting the destination information of the destination field of the data packet to a prescribed operation corresponds to a physical address of the destination information of the destination field of the data packet.

31. The apparatus of claim 30, wherein the prescribed operation is a remainder operation having a domain including all values of the destination information and having a modulus equal to or greater than a number of the plurality of node groups and equal to or less than a maximum value of the physical address.

32. An apparatus as in claim 25, further comprising:

assignment means for assigning a hash address to a specific node by applying modulo N arithmetic to the specific node's number.

* * * * *